United States Patent [19]
Nagai et al.

[11] Patent Number: 5,223,991
[45] Date of Patent: Jun. 29, 1993

[54] DIGITAL VIDEO TAPE RECORDER

[75] Inventors: Michio Nagai, Saitama; Takahito Seki, Kanagawa, both of Japan

[73] Assignee: Sony Corporation, Tokyo, Japan

[21] Appl. No.: 685,665

[22] Filed: Apr. 16, 1991

[30] Foreign Application Priority Data

Apr. 26, 1990 [JP] Japan ................................. 2-110808

[51] Int. Cl.⁵ .................... G11B 20/10; G11B 5/09; G11B 5/18; H04N 5/78
[52] U.S. Cl. .............................. 360/72.2; 360/10.3; 360/37.1; 360/39; 360/48; 360/51
[58] Field of Search .............. 360/72.2, 37.1, 48, 360/39, 40, 27, 51, 10.3; 371/36, 40, 46

[56] References Cited

U.S. PATENT DOCUMENTS

| Re. 33,665 | 8/1991 | Ogawa | 360/51 |
| 4,620,300 | 10/1986 | Ogawa | 360/51 |
| 4,811,123 | 3/1989 | Yoshinaka | 360/64 |
| 4,835,759 | 5/1989 | Saito et al. | 360/39 |
| 4,899,232 | 2/1990 | Odaka et al. | 360/48 |
| 5,068,752 | 11/1991 | Tanaka et al. | 360/32 |
| 5,091,805 | 2/1992 | Odaka et al. | 360/48 |
| 5,111,463 | 5/1992 | Zook | 360/48 |
| 5,122,912 | 6/1992 | Kanota et al. | 360/40 |

FOREIGN PATENT DOCUMENTS 246883 11/1987 European Pat. Off. .
2192089 12/1987 United Kingdom .

OTHER PUBLICATIONS

Patent Abstracts of Japan vol. 7, No. 238(P-231) Oct. 22, 1983 and JP-A-58 125208 (Sony) Jul. 26, 1983.
Patent Abstracts of Japan vol. 14, No. 021(P-990) Jan. 17, 1990 and JP-A-01 263976 (Matsushita) Oct. 20, 1989.

Primary Examiner—Stuart S. Levy
Assistant Examiner—Craig A. Remer
Attorney, Agent, or Firm—William S. Frommer; Alvin Sinderbrand

[57] ABSTRACT

In a digital signal reproducing apparatus for detecting identifying data in a reproduced digital data signal which had been recorded on slant tracks formed sequentially on a magnetic tape by a rotary head and which is reproduced at a speed higher than a normal playback speed, a synchronizing detector circuit detects synchronizing data included in the reproduced digital signal and, in response thereto, a pulse signal is generated and supplied to an identifying data detector circuit which, in response to such pulse signal, receives a plurality of corresponding identifying data. The identifying data detector circuit determines the identifying data value which corresponds to the majority of the received plurality of identifying data.

8 Claims, 5 Drawing Sheets

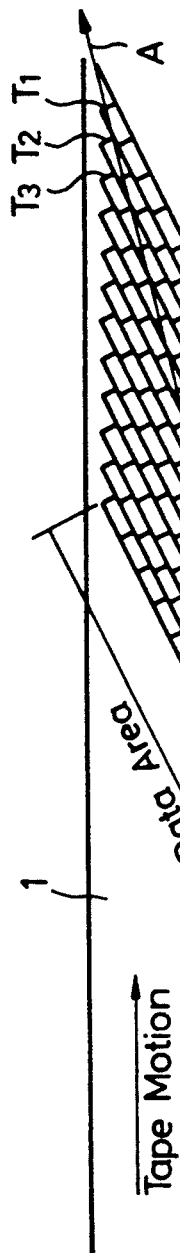
F I G. 3A Tape Pattern
F I G. 3B Reproduced RF
F I G. 3C Sync. Pulse
F I G. 3D Data Valid Signal Envelope
F I G. 3E ID Load Pulse (Byte 0)

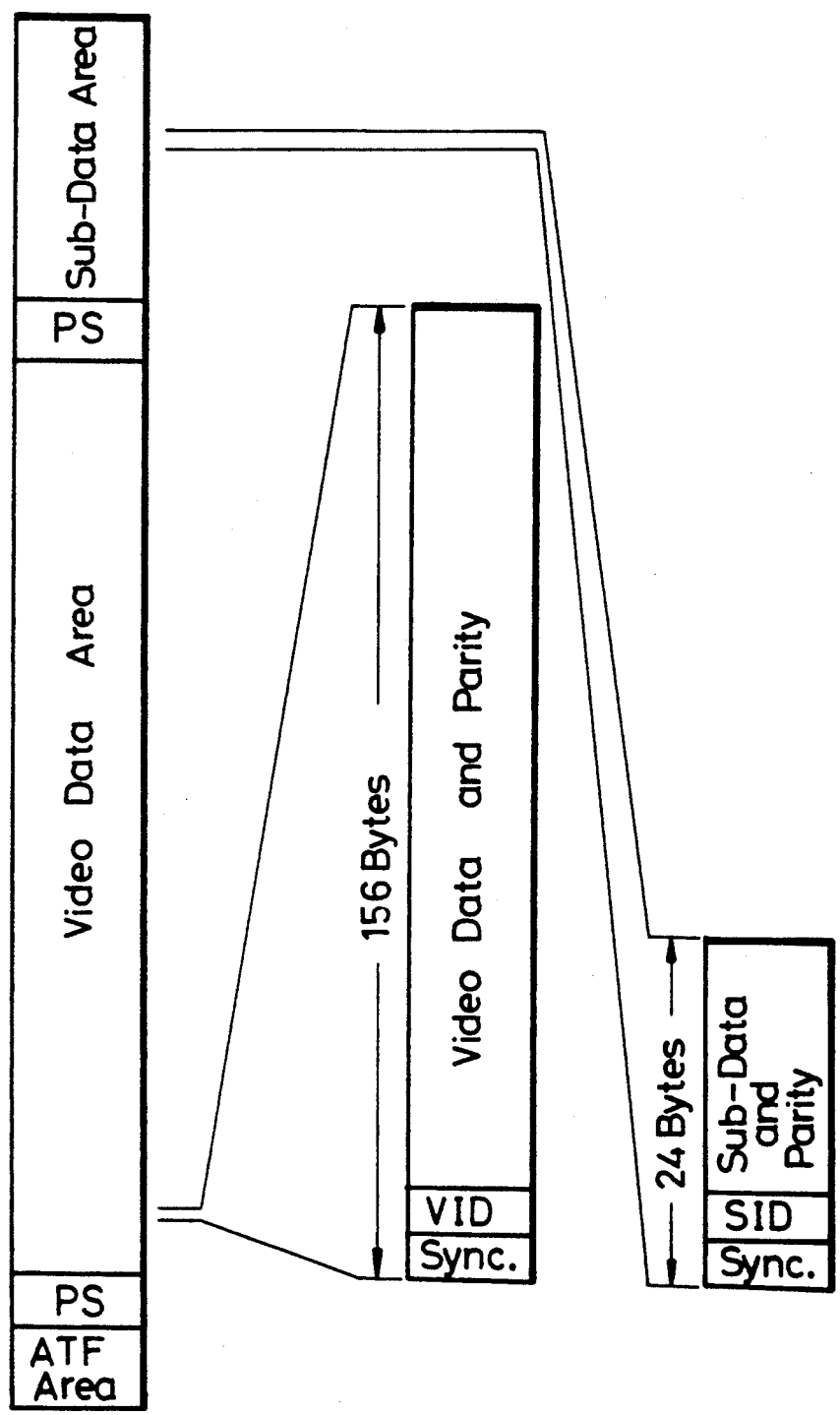

FIG. 5A
Video ID
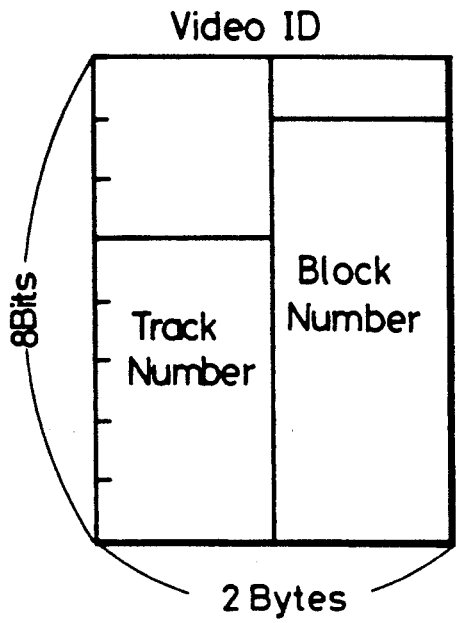
FIG. 5B
Sub Data ID
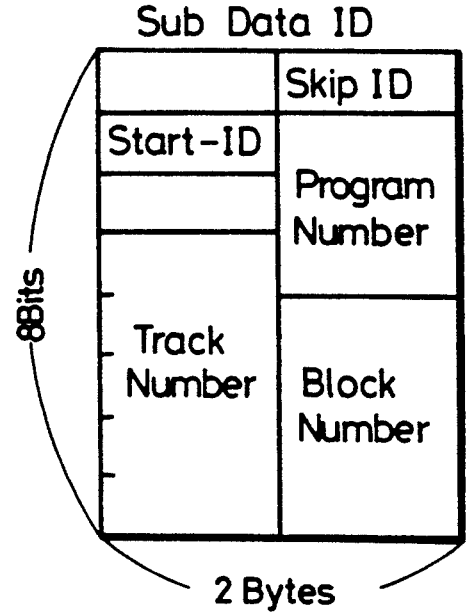
FIG. 6A Data 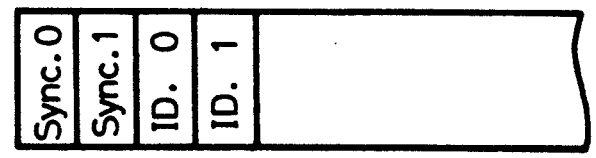
FIG. 6B Sync. Pulse 
FIG. 6C Load Pulse (a) (Byte 0) 
FIG. 6D Load Pulse (b) (Byte 1) 

DIGITAL VIDEO TAPE RECORDER

BACKGROUND OF THE INVENTION

1. Field of the Invention

The present invention generally relates to digital data reproducing apparatus usable in a so-called digital video tape recorder (VTR) and, more particularly, to a video tape recorder technique for detecting data in a high speed search mode.

2. Description of the Prior Art

When a video signal and an audio signal are recorded on a magnetic tape by a helical scan rotary head assembly so as to form oblique tracks and then reproduced, the video and audio signals are generally converted to digital data and recorded on and/or reproduced from the magnetic tape in practice, because the video and audio data can be recorded and/or reproduced at high definition if converted into digital data.

In the case of a digital VTR in which the video signal is digitized and then recorded, recorded digital data such as a video signal and so on are divided into blocks at each predetermined length of data. An error correction code called a parity is added to every block together with video data and identifying (ID) data is added to every block. A variety of control data such as track number, block number, program number, start ID data, skip ID data and so on are recorded as the ID data.

In this case, ID data such as track number, block number and so on are recorded in each block within a video data recording area, and ID data such as start ID data, skip ID data and so on are recorded in each block of a sub-data area which is provided independently of the video data recording area.

The ID data is detected from a reproduced signal not only in a normal speed reproduction mode but also in a high speed search mode in which a necessary event is searched in, for example, a fast forward mode. However, ID data cannot be accurately detected from the reproduced data without difficulty in the high speed search mode because a magnetic head does not always trace each of the tracks on the magnetic tape.

OBJECTS AND SUMMARY OF THE INVENTION

Accordingly, it is an object of the present invention to provide an improved digital data reproducing apparatus which can eliminate the aforenoted disadvantage of the prior art.

More specifically, it is an object of the present invention to provide a digital data reproducing apparatus in which identifying data is detected from a reproduced signal with high accuracy utilizing a majority logic circuit.

It is another object of the present invention to provide a digital data reproducing apparatus in which only a reproduced signal from an interval in which an accurate reproduced signal is output is supplied to a majority circuit as identifying data so that the identifying data can be detected from a reproduced signal with high accuracy.

It is a further object of the present invention to provide a digital data reproducing apparatus which is suitable for use in a so-called digital video tape recorder.

As an aspect of the present invention, an apparatus for reproducing a digital signal recorded on tracks formed sequentially on a magnetic tape by a rotary head is comprised of a playback device for driving the magnetic tape at a speed higher than the normal playback speed and reproducing the digital signal from the tracks, and a detector circuit for deriving a plurality of identifying data included in the reproduced digital signal and accurately detecting the identifying data by a majority rule.

The above, and other objects, features and advantages of the present invention will become apparent from the following detailed description of an illustrative embodiment when read in conjunction with the accompanying drawings, in which like reference numerals are used to identify the same or similar parts.

BRIEF DESCRIPTION OF THE DRAWINGS

FIGS. 3A-3E are timing charts to which reference is made in explaining the operation of the disclosed embodiment of the present invention;

FIGS. 4A-4C and FIGS. 5A and 5B are schematic representations of examples of data used in the disclosed embodiment of the present invention; and FIGS. 6A-6D are timing charts to which reference is made in explaining the operation of the disclosed embodiment of the present invention.

DETAILED DESCRIPTION OF THE PREFERRED EMBODIMENT

The present invention will now be described with reference to the accompanying drawings.

Figure 1:
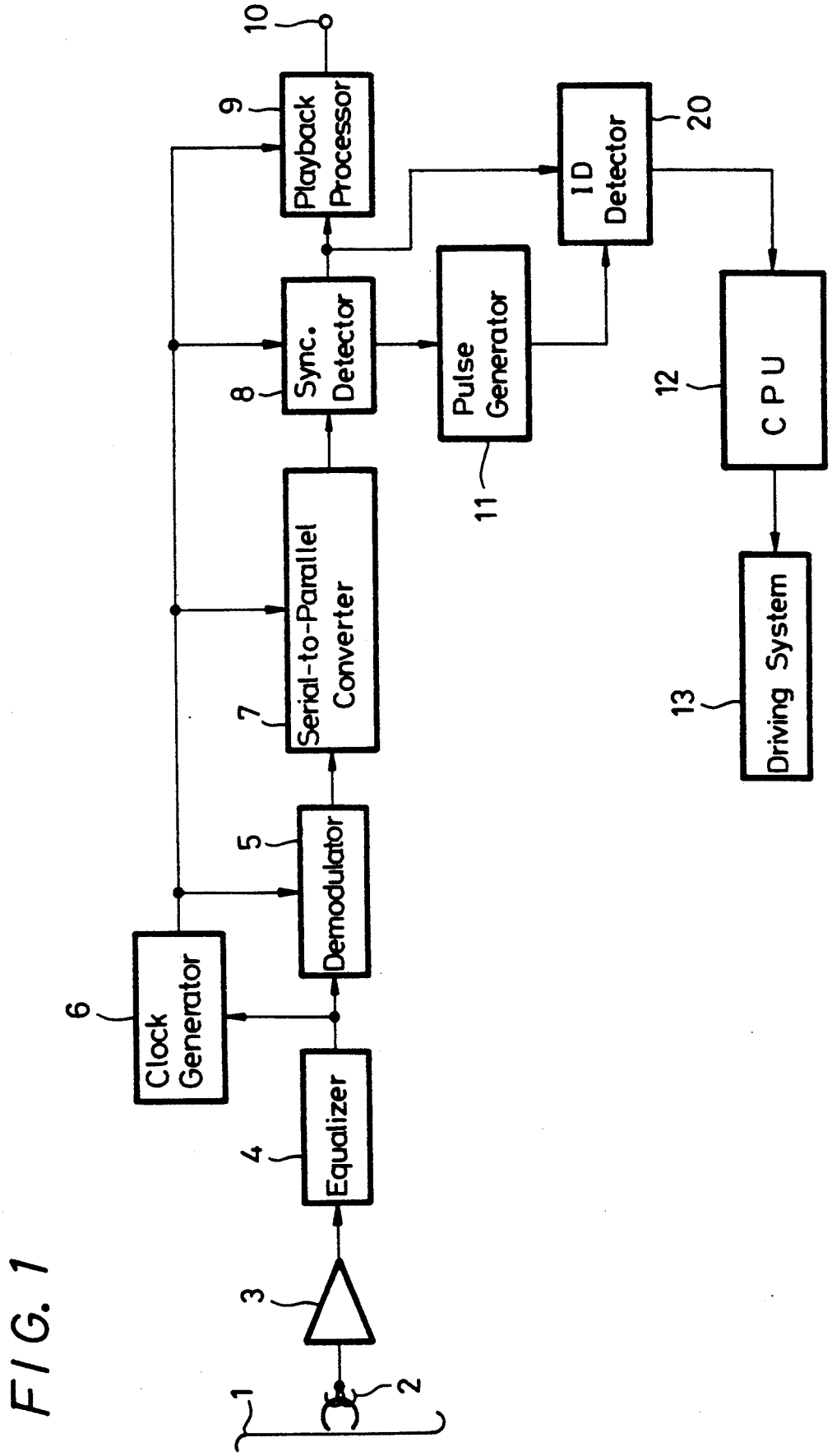
FIG. 1 is a schematic diagram showing in block form a digital data reproducing apparatus according to an embodiment of the present invention.

In the preferred embodiment, the digital data reproducing apparatus of the present invention is incorporated in a digital VTR which reproduces a video signal converted to a digital signal. FIG. 1 shows in block form an overall arrangement of the digital data reproducing apparatus according to this embodiment of the present invention.

Referring to FIG. 1, a signal reproduced from a magnetic tape 1 by a magnetic head 2 attached to a rotary head drum (not shown) is supplied through a preamplifier 3 and an equalizer 4 to a demodulator circuit 5, and the reproduced signal is demodulated by the demodulator circuit 5 to provide digital data. The output of the equalizer 4 is also supplied to a clock reproducing circuit 6, which generates a clock synchronized with the reproduced signal. This clock will hereinafter be referred to as a reproduced clock. The demodulated digital data from the demodulator circuit 5 is supplied to a serial-to-parallel converter circuit 7, in which it is converted into parallel data and supplied to a synchronizing detector circuit 8. The synchronizing detector circuit 8 detects a synchronizing signal included in the reproduced data. In the preferred embodiment, the synchronizing signal is included in recorded data of each block and the synchronizing signal is detected from reproduced data of each block. Reproduced data from the synchronizing detector circuit 8 is supplied to a playback processor circuit 9, in which it is processed in a predetermined reproduced signal processing manner, and a reproduced video signal is supplied therefrom to an output terminal 10.

The reproduced clock from the clock reproducing circuit 6 is supplied to the demodulator circuit 5, the serial-to-parallel converter circuit 7, the synchronizing detecting circuit 8 and the playback processor circuit 9 so as to enable these circuits to perform signal processing in synchronism with the reproduced clock.

The reproduced data from the synchronizing ("sync.") detector circuit 8 is supplied to an identifying (ID) data detector circuit 20, and ID data included in a respective byte of the reproduced data is detected.

In the above-described situation, a data valid signal is generated by the sync. detector circuit 8 on the basis of the synchronizing ("sync.") signal detected thereby. This data valid signal is supplied to a pulse generator circuit 11, which generates an ID load pulse. This data valid signal becomes a high level signal "1" when the sync. signal is detected from the reproduced data of each block and a low level signal "0" when the sync. signal is not detected from the reproduced data. When it detects that the data valid signal is a high level signal "1", the pulse generator circuit 11 outputs the ID load pulse which is used to extract the ID data at a predetermined time.

The ID load pulse is supplied to the ID detector circuit 20, which extracts ID data on the basis of the ID load pulse. In this embodiment, as will be described later, the ID detector circuit 20 includes a majority circuit 30 used to identify the ID data extracted by the ID detector circuit 20 in the high speed search mode.

ID data from the ID detector circuit 20 is supplied to a central processing unit (CPU) 12 which controls the operation of the VTR, and the contents of the reproduced ID data are identified by the CPU 12 whereupon, for example, a transport control signal may be supplied to a driving circuit 13 so as to control the transport of the magnetic tape 1.

Figure 2:
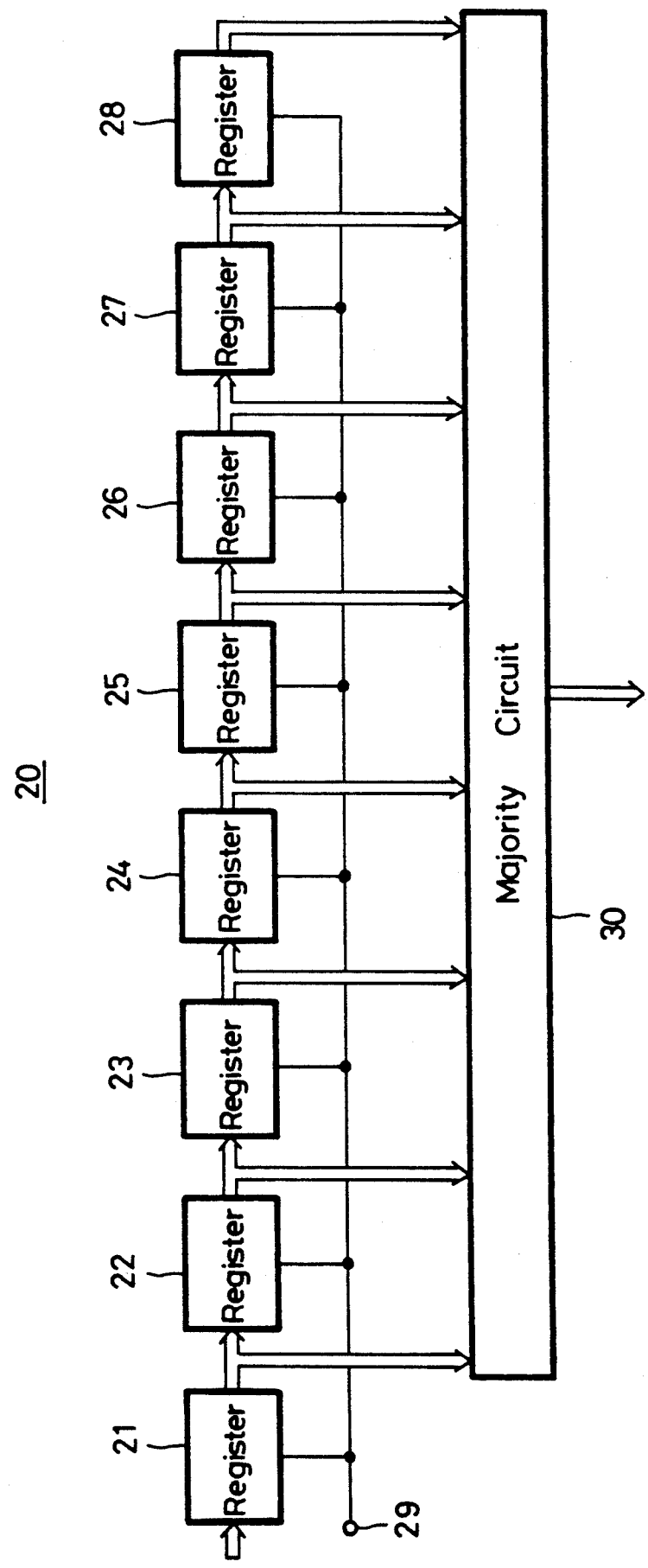
FIG. 2 is a schematic circuit block diagram showing a portion of the apparatus of FIG. 1.

FIG. 2 shows a circuit arrangement of the ID detector circuit 20, in accordance with the preferred embodiment. As shown in FIG. 2, the ID detector circuit 20 is composed of eight registers 21, 22, . . . , 28 connected in cascade and the majority circuit 30 to which data latched in the eight registers 21 to 28 are supplied. Reproduced data from the sync. detector circuit 8 (see FIG. 1) are sequentially supplied to the eight registers 21, 22, . . . , 28 connected in cascade. In this situation, the ID load pulse is supplied from the pulse generator circuit 11 to each of the registers 21 to 28 through a terminal 29. In response to the ID load pulse, each of the eight registers 21 to 28 latches the ID data so that the eight last reproduced ID data are always set in respective ones of the eight registers 21 through 28.

The ID data latched in the respective registers 21 to 28 are supplied to the majority circuit 30 which determines an output ID data according to the majority rule. More specifically, when the ID data supplied from each of the respective registers 21 to 28 are all the same, the ID data are directly output from the majority circuit 30. On the other hand, when a variety of ID data are respectively supplied from the registers 21 to 28, the same kind of ID data supplied from the majority of the registers are output from the majority circuit 30.

The manner of recording data on the magnetic tape 1 to be reproduced by the VTR of this embodiment will now be described with reference to FIGS. 3-5.

In this embodiment, as shown in FIG. 3A, slant tracks T1, T2, T3, . . . are sequentially formed on the magnetic tape 1 and video signals converted to digital data or the like are recorded on the tracks T1, T2, T3, . . . and so forth. In this case, the central portion of each of the tracks T1, T2, T3, . . . is allocated to a video data area in which the video signal data is recorded and a portion near the end of the video data area (upper end) is allocated to a sub-data area.

Each of the tracks T1, T2, T3, . . . will now be described more fully with reference to FIGS. 4A through 4C. As shown in FIG. 4A, a starting portion of each track is allocated as an ATF (automatic tracking control) pilot signal recording area, a video data area is formed with a predetermined spacing ("PS") or gap between it and the ATF pilot signal recording area, and a sub-data area is formed with a predetermined spacing ("PS") or gap between it and the video data area.

As shown in FIG. 4B, in the video data area in which the digitized video signal is recorded, each block has 156 bytes in which a synchronizing (sync.) signal and video ID (VID) data are recorded at the starting portion of each block, and video data and parity data (error correction code) are recorded in the remaining interval. Each video ID data block is preferably formed of 2 bytes (16 bits).

As shown in FIG. 4C, in the sub-data area in which a variety of sub-data are recorded, each block has 24 bytes. Thus, the length of one block in the sub-data area is shorter than one block in the video data area. A sync. signal and a sub ID (SID) data are recorded in the starting portion of each block and a variety of sub-data and parity data are recorded in the remaining interval. The sub ID data of one block is formed of 2 bytes (16 bits).

In the video ID data of 2 bytes in the video data area, as shown in FIG. 5A, 5 bits of track number data and 7 bits of block number data are recorded. Further, in the sub ID data of 2 bytes in the sub data area, as shown in FIG. 5B, one bit of start ID data, one bit of skip ID data, 5 bits of track number data, 3 bits of program number data and 4 bits of block number data are recorded. The start ID data and the skip ID data are used to find the starting portion of the recorded event in, for example the high speed index search mode.

The operation of reproducing recorded data from each track thus formed will be described next.

In the normal speed playback mode, the magnetic head 2 scans respective tracks in a predetermined order. However, when the high speed search is carried out, as shown in FIG. 3A by an arrow A, the locus of the magnetic head 2 on the magnetic tape 1 spreads over a plurality of tracks so that the higher the search speed becomes, the shorter the scanning time of the magnetic head 2 per track becomes. In this situation, the recording azimuth angles of the respective tracks T1, T2, T3, . . . are alternately changed at every track so that, as shown in FIG. 3B, the envelope waveform of the reproduced RF (radio frequency) signal repeatedly increases and decreases. Here, when the envelope value is a maximum, the azimuth angle of the playback head is coincident with that of the recording track, while when the envelope value is a minimum, the azimuth angle of the playback head is different from that of the recording track.

When such a reproduced RF signal is obtained, near a portion where the envelope value becomes a maximum, the sync. signal included in the reproduced signal of each block is detected by the sync. detector circuit 8 shown in FIG. 3C. A data valid signal (see FIG. 3D) which is a high level signal "1" during the period in which this sync. signal is detected is supplied from the sync. detector circuit 8 to the pulse generator circuit 11. The pulse generator circuit 11 generates an ID load pulse (see FIG. 3E) only during the period in which the data valid signal remains at a high level. This ID load pulse is supplied to the ID detector circuit 20, whereby ID data are sequentially set in the respective registers 21 to 28 of the ID detector circuit 20.

In the above-described situation, in order that the ID data, recorded after the synchronizing signal which is recorded at the starting portion of each block by a plurality of bits as shown in FIG. 6A, may be extracted, the ID data are set by the ID load pulse which, for example, as shown in FIG. 6C, goes to a high level with a time delay to extract necessary ID data from the sync. signal detecting pulse shown in FIG. 6B. More specifically, when the ID data recorded at the first bit of the ID data recording portion is extracted, the ID load pulse goes to a high level with a time delay corresponding to one bit from the sync. signal detecting pulse as shown in FIG. 6C. Similarly, when the ID data recorded at the second bit of the ID data recording portion is extracted, the ID load pulse goes to a high level with a time delay corresponding to 2 bits from the sync. signal detecting pulse as shown in FIG. 6D.

The ID data extracted as described above and sequentially set in the respective registers 21 to 28 are identified by the majority circuit 30 on the basis of the majority rule. Since the ID data are accurately identified by the majority rule, the accuracy of the ID data detection in the high speed search mode can be increased. That is, since the eight last reproduced ID data are set in the eight registers 21 to 28, the eight reproduced ID data are constantly identified by the majority rule so that, even if an error temporarily occurs in the reproduced data, data to be identified can be prevented from being affected by such error. Thus, even in the high speed search mode, accurate ID data are constantly supplied to the central processing unit 12, whereby the central processing unit 12 can properly control the operation of the digital VTR. In this situation, since the ID data are set in the respective registers 21 to 28 constituting the ID detector circuit 20 on the basis of the data valid signal only when the reproduced signal is at a high level, reproduced ID data can be accurately detected in the high speed search mode.

Further, in this embodiment, the length of one block of the sub-data area in which the start ID data, the skip ID data or the like particularly required in the high speed search mode are recorded is selected to be shorter than that of one block of the video data area. As a result ID data are recorded in a relatively short interval so that the frequency in which the ID data is detected (reproduced) in the high speed search mode is increased. Therefore, in the high speed search mode, the ID data can be detected frequently, which can increase the speed of the high speed search mode in which the ID data, for example, can be detected as compared with the prior art.

While the present invention is applied to a digital VTR which reproduces a digital video signal in the above-mentioned embodiment, the present invention is not limited thereto and may be applied to a reproducing apparatus which reproduces data from a record medium in which other digital data are recorded.

As set out above, according to the present invention, since the ID data is detected by the majority rule, the detection accuracy of ID data can be increased. Furthermore, since only reproduced signals from an interval in which accurate reproduced signals are output are supplied to the majority circuit as the ID data, the detection accuracy of the ID data can thereby be increased.

Having described a preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

We claim as our invention:

1. An apparatus for reproducing a digital data signal having video data signals each including synchronizing data and respective identifying data recorded in slant tracks formed sequentially on a magnetic tape by a rotary head, said apparatus comprising:

playback means for driving said magnetic tape at a speed higher than a normal playback speed and simultaneously reproducing said digital data signal from said tracks;

first detector means for detecting said synchronizing data included in the video data signals of the reproduced digital data signal and for generating therefrom at least one gate pulse corresponding to the detected synchronizing data; and second detector means including gate means for gating a plurality of the identifying data in response to said gate pulse, and means receiving said plurality of said identifying data from said gate means for determining with relatively high accuracy an identifying data value which corresponds to a majority value of the received plurality of identifying data.

2. An apparatus according to claim 1, wherein said gate means includes a plurality of register means each sequentially receiving said plurality of the identifying data in response to said gate pulse.

3. An apparatus according to claim 1, wherein said digital data signal further includes sub-data signals.

4. An apparatus according to claim 3, wherein each of said video data signals occupies a first predetermined length of said slant tracks and each of said sub-data signals occupies a second predetermined length of said slant tracks which is shorter than said first predetermined length.

5. An apparatus according to claim 3, wherein each of said sub-data signals includes respective identifying data.

6. An apparatus according to claim 5, wherein the respective identifying data of each of said video data signals identifies a track and a block to which said reproduced digital data signal belongs.

7. An apparatus according to claim 5, wherein the respective identifying data of each of said sub-data signals identifies a track, a block and a program to which said reproduced digital data signal belongs.

8. An apparatus according to claim 7, wherein the respective identifying data of each of said sub-data signals includes start identifying data and skip identifying data.

* * * * *